US012647734B2

(12) United States Patent
Rusconi Clerici Beltrami et al.

(10) Patent No.: US 12,647,734 B2
(45) Date of Patent: Jun. 2, 2026

(54) MEMS DEVICE WITH A CONNECTING ELEMENT

(71) Applicant: USOUND GMBH, Graz (AT)

(72) Inventors: Andrea Rusconi Clerici Beltrami, Vienna (AT); Ferruccio Bottoni, Graz (AT); Samu Bence Horváth, Vienna (AT)

(73) Assignee: USOUND GMBH, Graz (AT)

( * ) Notice: Subject to any disclaimer, the term of this patent is extended or adjusted under 35 U.S.C. 154(b) by 167 days.

(21) Appl. No.: 18/544,567

(22) Filed: Dec. 19, 2023

(65) Prior Publication Data

US 2024/0214746 A1 Jun. 27, 2024

(30) Foreign Application Priority Data

Dec. 23, 2022 (DE) ..................... 10 2022 134 733.8

(51) Int. Cl.
*H04R 17/00* (2006.01)

(52) U.S. Cl.
CPC ....... *H04R 17/00* (2013.01); *H04R 2201/003* (2013.01)

(58) Field of Classification Search
CPC .............. H04R 17/00; H04R 2201/003; B81B 2201/0257; B81B 2203/0118
See application file for complete search history.

(56) References Cited

U.S. PATENT DOCUMENTS

| | | | |
|---|---|---|---|
| 10,349,182 B2 | 7/2019 | Stoppel et al. | |
| 11,202,155 B2 | 12/2021 | Rusconi Clerici Beltrami et al. | |
| 2022/0256284 A1* | 8/2022 | Patel ........................ | H04R 3/02 |
| 2023/0174369 A1 | 6/2023 | Rusconi Clerici Beltrami et al. | |

FOREIGN PATENT DOCUMENTS

| | | |
|---|---|---|
| CN | 215268715 | 12/2021 |
| JP | S59139799 | 8/1984 |
| WO | WO 2021/134667 A1 | 7/2021 |

OTHER PUBLICATIONS

English machine translation of WO2021134667.*
European Search Report for corresponding Application No. EP 23216673, dated May 24, 2024, 7 pages.
German Search Report for corresponding DE Application No. 10 2022 134 733.8, dated Sep. 7, 2023, 8 pages.

* cited by examiner

*Primary Examiner* — James K Mooney
(74) *Attorney, Agent, or Firm* — Dority & Manning, P.A.

(57) ABSTRACT

A MEMS device for generating sound and/or detecting sound includes a diaphragm that is deflectable along a stroke axis and a MEMS unit. The MEMS unit includes at least one cantilever arm for generating and/or detecting a stroke motion of the diaphragm and which is spaced apart from the diaphragm along the stroke axis such that a cavity is formed between the cantilever arm and the diaphragm. The MEMs unit also includes a stroke structure arranged in the cavity and connected to the diaphragm, and a connecting element that movably connects the cantilever arm to the stroke structure. The connecting element narrows and/or widens in at least one area in the direction of the stroke structure, and/or has at least one recess.

20 Claims, 2 Drawing Sheets

MEMS DEVICE WITH A CONNECTING ELEMENT

FIELD OF THE INVENTION

The present invention relates to a MEMS device, in particular for generating sound and/or detecting sound (preferably audible sound and/or ultrasound). The MEMS device includes a diaphragm which is deflectable along a stroke axis, and a MEMS unit. The MEMS unit includes at least one, in particular piezoelectric, cantilever arm for generating and/or detecting a stroke motion of the diaphragm, the cantilever arm being spaced apart from the diaphragm along the stroke axis such that a cavity is formed between the cantilever arm and the diaphragm. The MEMS unit also includes a stroke structure which is arranged in the cavity and is connected to the diaphragm, and a connecting element which movably connects the cantilever arm to the stroke structure. The present invention further relates to a MEMS unit for a corresponding MEMS device.

BACKGROUND

A MEMS, as disclosed in WO 2016/034665 A1, includes a diaphragm, a stroke structure which is coupled to the diaphragm, and at least two piezoelectric actuators which are connected to a plurality of mutually spaced contact points on the stroke structure via a plurality of mutually spaced connecting elements. The at least two piezoelectric actuators are designed to induce a stroke motion of the stroke structure in order to deflect the diaphragm. Moreover, each of the at least two piezoelectric actuators is connected to at least two mutually spaced contact points on the stroke structure via at least two mutually spaced connecting elements. It has been shown that the connecting elements and the contact points are prone to damage due to the action of external force.

SUMMARY OF THE INVENTION

In various aspects, the present subject matter is designed to eliminate the disadvantages known from the state of the art, in particular to create a MEMS device and a MEMS unit which are less prone to damage due to the action of external force.

In various aspects, such disadvantages are eliminated by means of a MEMS device and/or a MEMS unit having the features described and claimed herein.

In one aspect, the present subject matter relates to a MEMS device, in particular for generating sound and/or detecting sound, specifically preferably audible sound and/or ultrasound. The MEMS device is, in particular, a MEMS loudspeaker, a MEMS microphone and/or a MEMS sensor. The MEMS device includes a diaphragm which is deflectable along a stroke axis. The MEMS device also includes a MEMS unit. The MEMS unit includes at least one, in particular piezoelectric, cantilever arm for generating and/or detecting a stroke motion of the diaphragm. The cantilever arm is spaced apart from the diaphragm along the stroke axis such that a cavity is formed between the cantilever arm and the diaphragm. The MEMS unit also includes a stroke structure which is arranged in the cavity and is connected to the diaphragm. Accordingly, the stroke structure oscillates together with the diaphragm along the stroke axis during use as intended. Furthermore, the MEMS unit includes a connecting element which movably connects the cantilever arm to the stroke structure.

It is advantageous when the connecting element is narrowed in at least one section and/or widened in at least one section in the direction of the stroke structure. Due to an appropriate widening of the connecting element, sections which are subjected to particularly high loads can be strengthened. Additionally or alternatively, areas which are subjected to lower loads can be narrowed in order to increase the elasticity and/or flexibility of the connecting element.

Additionally or alternatively, it is advantageous when the connecting element has at least one recess. As a result, the weight of the connecting element can be reduced, which, in turn, can reduce the forces acting on the connecting element. Moreover, the elasticity and/or flexibility of the connecting element can be increased in the area of the connecting element in which a recess is arranged. Consequently, for example, an area of the connecting element can be made more robust by means of widening the connecting element. Simultaneously, the necessary elasticity and/or flexibility can be ensured in this area by means of an appropriate recess.

It is advantageous when the cantilever arm is connected to the stroke structure via only one single connecting element. Advantageously, the connecting element can be made highly robust in this way, since substantially all available installation space can be used for the one connecting element.

The stroke structure can be formed as a one-part or as a multi-part structure. In the case of a multi-part stroke structure, at least two parts of the stroke structure can be directly connected to one another. Alternatively, the at least two parts can also be indirectly connected to one another via an additional element which is arranged between the at least two parts of the stroke structure. The additional element can be, for example, the diaphragm, in particular a stiffening element of the diaphragm, or an additional coupling element extending between the at least two parts of the stroke structure. The connection between the at least two parts of the stroke structure can be rigid or movable.

It is advantageous when two opposite longitudinal sides of the connecting element and/or a basic shape of the connecting element taper(s) in the shape of a trapezoid in the direction of the stroke structure.

It is likewise advantageous when the connecting element has at least one cantilever section in which the connecting element has at least one cantilever which extends in a transverse direction of the connecting element toward one of the two longitudinal sides of the connecting element and/or projects outwards in a transverse direction of the connecting element.

It is advantageous when the at least one cantilever is oriented perpendicularly with respect to a longitudinal axis of the connecting element. Additionally or alternatively, it is advantageous when two opposite longitudinal sides of the cantilever extend parallel to a transverse axis of the connecting element.

Furthermore, it is advantageous when a free cantilever end of the at least one cantilever is chamfered in the direction of the stroke structure. As a result, the connecting element tapers in the area of the cantilever section in the direction of the stroke structure.

It is also advantageous when the cantilever section includes two cantilevers which are situated opposite one another, wherein, preferably, a first cantilever extends toward a first longitudinal side of the connecting element and a second cantilever extends toward a second longitudinal side of the connecting element.

It is also advantageous when the connecting element is axially symmetrical with respect to its longitudinal central axis.

It is also advantageous when the at least one recess extends completely through the connecting element in the direction of the stroke axis. Consequently, the recess has two openings which are situated opposite one another, of which openings one is located on a top side of the connecting element and the other is located on an underside of the connecting element. Additionally or alternatively, it is advantageous when the at least one recess is closed in the shape of a ring in its circumferential direction.

It is also advantageous when the recess is formed as a transverse slit extending in a transverse direction of the connecting element. Preferably, the transverse slit is arranged perpendicularly with respect to the longitudinal central axis of the connecting element.

Furthermore, it is advantageous when the at least one recess is arranged in the at least one cantilever section, the recess preferably extending into the first cantilever and/or the second cantilever.

It is advantageous when the connecting element is connected to the cantilever arm, in particular exclusively, in a preferably single, first contact area extending in a transverse direction of the cantilever arm. With respect to the device known from the state of the art, it has been shown that contact points are highly prone to breakage under higher loads. In contrast thereto, contact areas which extend across a greater range have higher compressive strength.

It is also advantageous when the cantilever arm is mounted on a carrier of the MEMS unit, in particular a carrier substrate, and has a free cantilever-arm-end facing away from the carrier.

It is advantageous when the first contact area is arranged on the free cantilever-arm-end and/or is narrower than the free cantilever-arm-end in a transverse direction of the cantilever arm.

It is also advantageous when the connecting element is connected to the stroke structure, in particular exclusively, in a preferably single, second contact area extending in a transverse direction of the cantilever arm.

It is also advantageous when the second contact area is arranged on a side wall of the stroke structure and/or extends completely across this side wall in a transverse direction of the cantilever arm.

Moreover, it is advantageous when the first contact area is wider than the second contact area in a transverse direction of the cantilever arm.

It is also advantageous when the connecting element includes at least one bridging section which preferably connects the at least one cantilever section to the first contact area, to the second contact area or to an adjacent further cantilever section.

It is advantageous when the at least one bridging section is arranged centrally in a transverse direction of the connecting element and/or has a smaller width in comparison with the at least one cantilever section.

It is likewise advantageous when the connecting element includes multiple bridging sections which are spaced apart from one another in a longitudinal direction of the connecting element. In this regard, it is advantageous, furthermore, when the bridging sections have a smaller width with respect to one another as the distance from the stroke structure decreases, wherein a cantilever arm-side bridging section preferably has a larger width than a stroke structure-side bridging section in a transverse direction of the connecting element.

It is also advantageous when the connecting element has a fir tree-like basic shape.

It is also advantageous when the connecting element includes multiple cantilever sections which are spaced apart from one another in a longitudinal direction of the connecting element, of which cantilever sections at least one is designed according to the preceding description, wherein the aforementioned features can be present individually or in any combination.

It is likewise advantageous when the cantilever sections have a smaller width with respect to one another as the distance from the stroke structure decreases, wherein a cantilever arm-side cantilever section preferably has a larger width than a stroke structure-side cantilever section in a transverse direction of the connecting element.

It is advantageous when the free cantilever ends of at least two cantilever sections which are adjacent to one another in a longitudinal direction of the connecting element are aligned with one another.

Furthermore, it is advantageous when the connecting element, in particular in the bridging section, has at least one lateral incision which extends from one of the two longitudinal sides of the connecting element into the connecting element.

It is likewise advantageous when, in the first contact area, a cantilever section or a bridging section of the connecting element is connected to the free cantilever-arm-end. Additionally or alternatively, it is advantageous when a cantilever section or a bridging section of the connecting element is connected to the stroke structure in the second contact area.

It is advantageous when the cantilever arm has an elastic carrier layer and/or at least one piezoelectric layer.

Very economical manufacturing is enabled when the carrier layer of the cantilever arm, the connecting element and a stroke-structure base of the stroke structure, in particular in the area of a stroke-structure end face which faces away from the diaphragm, are formed from a common, in particular monolithic, layer.

Furthermore, it is advantageous when the cantilever arm has a trapezoidal shape which tapers in the direction of the stroke structure. Additionally or alternatively, it is advantageous when the connecting element continues this trapezoidal shape in the direction of the stroke structure.

It is advantageous when the MEMS unit has multiple cantilever arms, in particular six, each of which is connected to the stroke structure via a, preferably single, connecting element, wherein the connecting elements are preferably designed according to the preceding description, wherein the aforementioned features can be present individually or in any combination.

It is also advantageous when the connecting element narrows and/or widens at least in one area in the direction of the stroke structure and/or when the connecting element has at least one recess.

In another aspect, the present subject matter relates to a MEMS unit, in particular for a MEMS device according to the preceding description, the MEMS unit having at least one, in particular piezoelectric, cantilever arm for generating and/or detecting a stroke motion of a diaphragm. The MEMS until also having a stroke structure which is connected to the diaphragm during use as intended, and a connecting element which movably connects the cantilever arm to the stroke structure. It is advantageous when the connecting element narrows and/or widens at least in one area in the direction of the stroke structure. Additionally or alternatively, it is advantageous when the connecting element has at least one recess.

It is advantageous when the MEMS unit is designed according to the MEMS unit of the above-described MEMS device, wherein the aforementioned features can be present individually or in any combination.

In a further aspect, the present subject matter relates to the use of a MEMS unit according to the preceding description in a MEMS device according to the preceding description, wherein the aforementioned features can be present individually or in any combination.

In yet another aspect, the present subject matter relates to an electronics device, in particular a headphone, glasses, a cell phone, a tablet and/or a wearable, including a MEMS device according to the preceding description, wherein the aforementioned features can be present individually or in any combination.

BRIEF DESCRIPTION OF THE DRAWINGS

Further advantages of the invention are described in the following exemplary embodiments, wherein.

DETAILED DESCRIPTION

In the following description of the alternative exemplary embodiments of the present subject matter, the same reference signs are utilized for features that are identical or at least comparable in terms of their configuration and/or mode of operation. Provided the features are not described in detail again, their design and/or mode of operation correspond/corresponds to the design and mode of operation of the above-described features. For the sake of greater clarity, reference signs for previously described components have not been individually included in the figures.

FIGS. 1 through 4 show one exemplary embodiment of the present subject matter having multiple cantilever arms 8. Alternatively, the device can also have only one cantilever arm 8, in which case the following description is to be read analogously.

Figure 1:
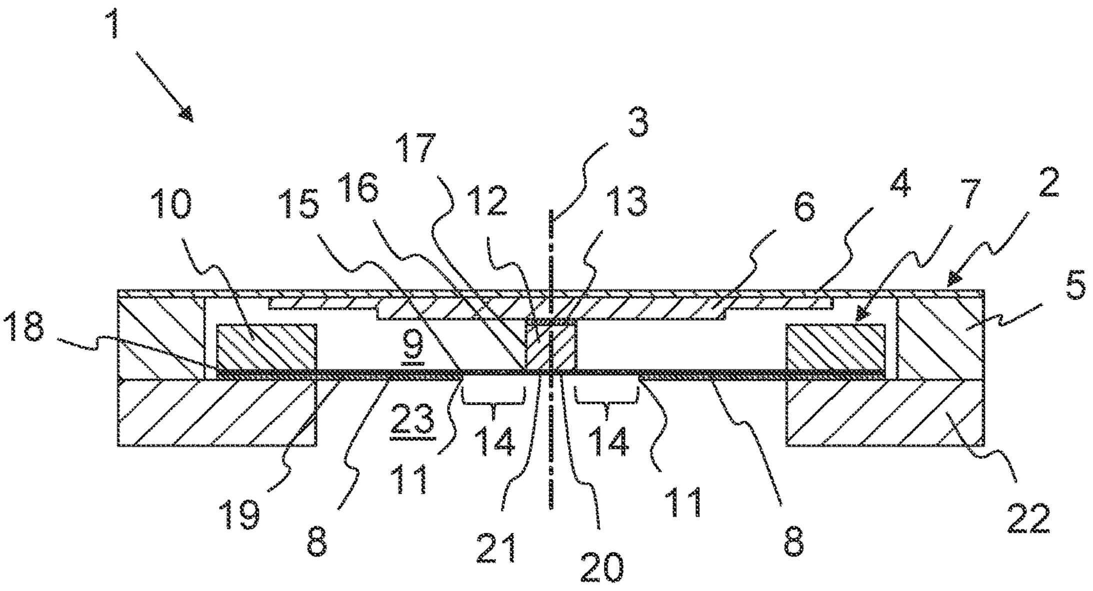
FIG. 1 shows a cross-sectional view of a MEMS device with a MEMS unit.

FIG. 1 shows a cross-sectional view of a MEMS device 1, in particular for generating sound and/or detecting sound. The MEMS device 1 can generate and/or detect, in particular, audible sound and/or ultrasound. The MEMS device 1 is preferably a MEMS loudspeaker, a MEMS microphone and/or a MEMS sensor. The MEMS device 1 is intended for an electronics device (not shown). The electronics device can preferably be designed such that it can be worn on the head or on the body. In particular, the electronics device is a headphone, glasses, a helmet, a headband, a cell phone, a tablet, a watch or a bracelet. Alternatively, the electronics device can also be designed, however, such that it can be installed, in turn, in other devices, such as, for example, a vehicle.

According to FIG. 1, the MEMS device 1 includes a diaphragm 2 which can be deflected along a stroke axis 3. The diaphragm 2 includes an elastic diaphragm layer 4 which is fastened in its edge area to a diaphragm carrier 5. Moreover, the diaphragm 2 has a stiffening element 6 which is indirectly connected to the diaphragm carrier 5 via the diaphragm layer 4.

The MEMS device 1 according to FIG. 1 also includes a MEMS unit 7. The MEMS unit 7 includes an, in particular piezoelectric, cantilever arm 8, with which a stroke motion of the diaphragm 2 along the stroke axis 3 can be generated and/or detected. The "cantilever arm" is considered to be a flexible element which is mounted on one side and has a deflectable free end. Furthermore, the MEMS unit 7 includes a carrier 10, in particular a carrier substrate, on which the at least one cantilever arm 8 is mounted. Consequently, the cantilever arm 8 has a free cantilever-arm-end 11 which faces away from the carrier 10 and can be deflected along the stroke axis 3.

The at least one cantilever arm 8 is spaced apart from the diaphragm 2 along the stroke axis 3 such that a cavity 9 is formed between the cantilever arm 8 and the diaphragm 2. In the present case, at least some of the cavity 9 is formed in the carrier 10 or is delimited by the carrier 10.

As is apparent from FIG. 1, the MEMS unit 7 also includes a stroke structure 12, at least some of which is arranged in the cavity 9. The stroke structure 12 is connected to the diaphragm 2. According to the present exemplary embodiment, the stroke structure 12 is adhered to the stiffening element 6 of the diaphragm 2 for this purpose by means of an adhesive 13. The stroke structure 12 and the carrier 10 are preferably formed from the same material, specifically, in particular, silicon, for manufacturing reasons. The stroke structure 12 can be formed as a one-part or as a multi-part structure. In the case of a multi-part stroke structure 12, at least two parts of the stroke structure 12 can be directly connected to one another. Alternatively, the at least two parts can also be indirectly connected to one another via an additional element which is arranged between them. The additional element can be, for example, the diaphragm 2, in particular the stiffening element 6 of the diaphragm 2, or an additional coupling element (not shown) extending between two parts of the stroke structure 12. The connection between the at least two parts of the stroke structure 12 can be rigid or movable.

The at least one cantilever arm 8 is indirectly movably connected to the stroke structure 12 via a connecting element 14. The design of this connecting element 14 is shown and described in detail in the following FIGS. 2, 3 and 4. During use as intended, the free cantilever-arm-end 11 is deflected in the direction of the stroke axis 3. In order to avoid tipping the stroke structure 12 and/or the diaphragm 2 during this curved deflection of the cantilever-arm-end 11, the cantilever arm 8 is indirectly connected in the region of its free cantilever-arm-end 11 to the stroke structure 12 via the connecting element 14. The connecting element 14 is elastic and/or flexible for this purpose.

The cantilever-arm-end 11 of the cantilever arm 8 is connected to the connecting element 14 in a first contact area 15. Moreover, the stroke structure 12 is connected to the connecting element 14 in a second contact area 16. As is apparent, in particular, from FIG. 1, the connecting element 14 is connected to one side wall 17 of the stroke structure 12.

The cantilever arm 8 is a multilayer structure. It includes an elastic carrier layer 18. Moreover, the cantilever arm 8 has a piezoelectric layer 19. The piezoelectric layer 19 is arranged between two electron layers (not shown here). The piezoelectric layer 19 can be located underneath the carrier layer 18, as shown in FIG. 1. Alternatively, however, the piezoelectric layer 19 can also be arranged on the carrier layer 18 as shown.

In the present exemplary embodiment, the MEMS unit 7 has multiple cantilever arms 8, each of which is connected to the stroke structure 12 via a single respective connecting element 14. For the sake of clarity, only one of these cantilever arms 8, including its corresponding connecting element 14, is provided with all reference characters. In order to be able to ensure economical and fast manufacturing, it is advantageous when the carrier layer 18 of the cantilever arms 8, the connecting elements 14 and a stroke-structure base 20 of the stroke structure 12 are formed from a common, in particular monolithic, layer. The stroke-structure base 20 is preferably arranged in the region of a stroke-structure end face 21 which faces away from the diaphragm 2.

The MEMS device 1 also includes, according to FIG. 1, a circuit board 22 on which the MEMS unit 7 is arranged. The circuit board 22 has a circuit-board cavity 23 which adjoins the cavity 9 in the MEMS unit 7. Consequently, the cavity 9 in the MEMS unit 7 and the circuit-board cavity 23 form a common acoustic cavity in the MEMS device 1. The cantilever arms 8 and the stroke structure 12 can move into the circuit-board cavity 23 along the stroke axis 3. In addition to the MEMS unit 7, the diaphragm carrier 5 is also fastened to the circuit board 22.

Figure 2:
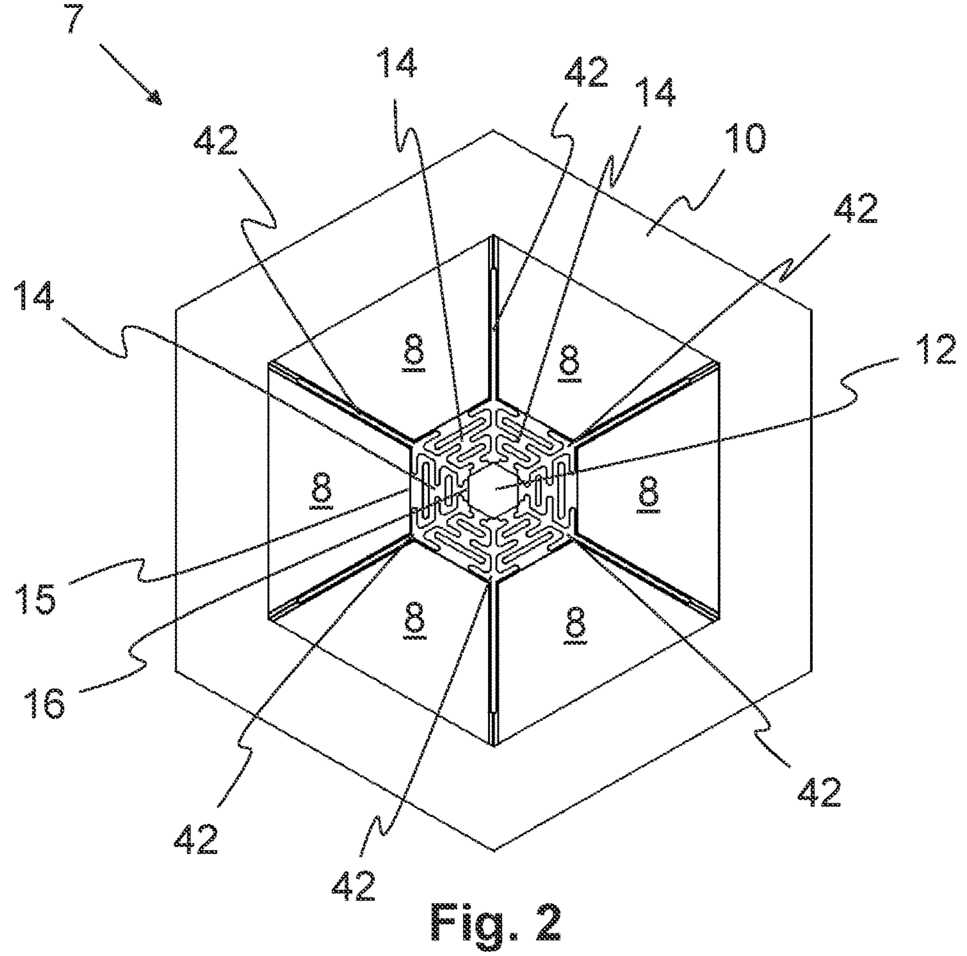
FIG. 2 shows a top view of the MEMS unit of the MEMS device shown in FIG. 1.

FIG. 2 shows a top view of the MEMS unit 7. In this view, it is apparent that the carrier 10 is formed as a closed and/or polygonal ring. The cantilever arms 8 are arranged at the carrier 10 so as to be distributed circumferentially and extend radially inwards. The stroke structure 12 is arranged in the center. The stroke structure 12 has a shape which corresponds to the carrier 10, specifically a polygonal shape in the present case. Consequently, the stroke structure 12 has multiple side walls 17, each of which is associated with one of the cantilever arms 8. The cantilever arms 8 have a trapezoidal shape which tapers in the direction of the stroke structure 12. This trapezoidal shape is continued by the associated connecting element 14 in the direction of the stroke structure 12 such that the connecting elements 14 also have a trapezoidal basic shape.

Figure 3:
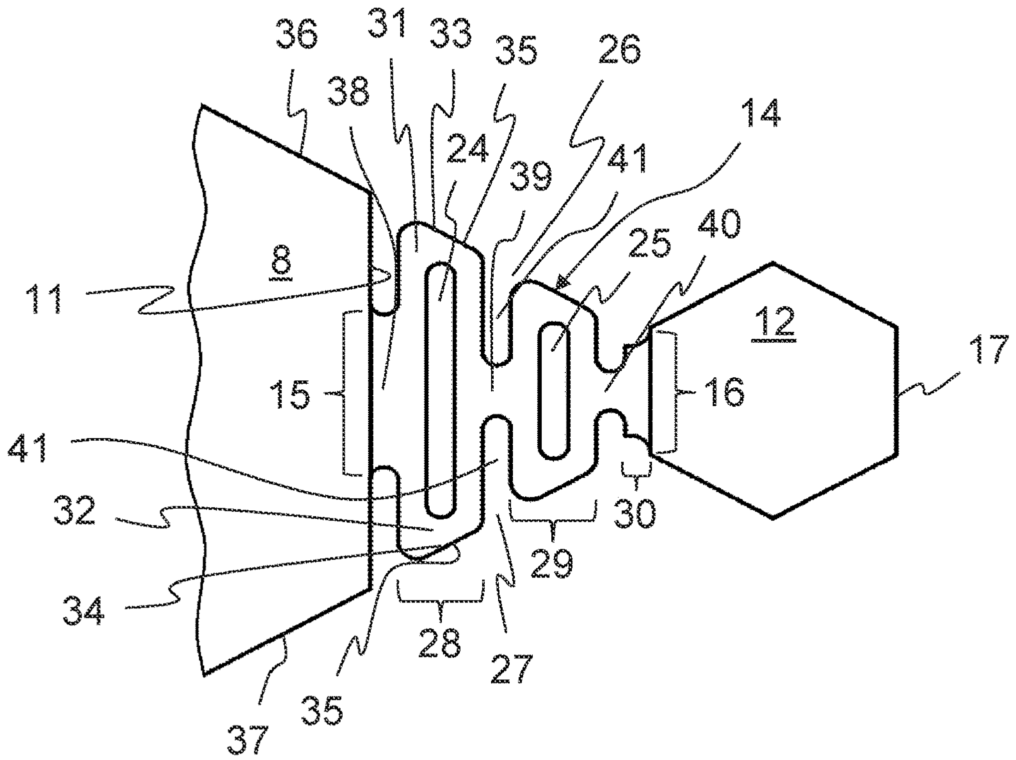
FIG. 3 shows a cut out, detailed view of a single cantilever arm with a connecting element and a stroke structure of the MEMS unit shown in FIG. 2.

FIG. 3 shows a cut out detailed view of the MEMS unit 7 (shown in FIG. 2) of the MEMS device 1 in the region of a cantilever-arm-end 11 of one of the cantilever arms 8. An exemplary embodiment having only one single cantilever arm 8 could be analogously designed in accordance with aspects of the present subject matter. As mentioned above, the free cantilever-arm-end 11 of the cantilever arm 8 is movably connected to the stroke structure 12 via a connecting element 14. As is apparent from FIG. 3, the cantilever arm 8 is connected to the stroke structure 12 via only one single connecting element 14. Advantageously, the available installation space for this single connecting element 14 can therefore be utilized in the best way possible.

The connecting element 14 narrows, according to the top view shown in FIG. 3, in the direction of the stroke structure 12 in at least one area. Moreover, the connecting element 14 widens in at least one area. Due to an appropriate widening of the connecting element 14, areas which are subjected to particularly high loads can be strengthened. Additionally, areas which are subjected to lower loads can be narrowed in order to increase the elasticity and/or flexibility of the connecting element 14.

Moreover, the connecting element 14 has at least one recess 24, 25. As a result, the weight of the connecting element 14 can be reduced, which, in turn, can reduce the forces acting on the connecting element 14. Moreover, the elasticity and/or flexibility of the connecting element 14 can be increased in the region of the connecting element 14 in which a recess 24, 25 is arranged. Consequently, for example, an area of the connecting element 14 can be made more robust by means of widening such area. The necessary elasticity and/or flexibility can be simultaneously ensured in this region by means of an appropriate recess 24, 25.

The at least one recess 24, 25 extends completely through the connecting element 14 in the direction of the stroke axis 3. Consequently, the recess 24, 25 has two openings which are arranged on two opposite sides of the connecting element 14. Moreover, the at least one recess 24, 25 is closed in the shape of a ring in its longitudinal direction. As a result, very high stability can be ensured. According to the present exemplary embodiment, recesses 24, 25 are formed as transverse slits extending in a transverse direction of the connecting element 14.

According to the top view shown in FIG. 3, two opposite longitudinal sides 26, 27 of the connecting element 14 taper in the direction of the stroke structure 12. The connecting element 14 is connected to the cantilever arm 8 exclusively in the single first contact area 15. The first contact area 15 is arranged on the free cantilever-arm-end 11. As is apparent from FIG. 3, the first contact area 15 is narrower than the free cantilever-arm-end 11 in a transverse direction of the cantilever arm 8.

The connecting element 14 according to FIG. 3 is connected to the stroke structure 12 exclusively in the single second contact area 16. The second contact area 16 extends in a transverse direction of the cantilever arm 8. The second contact area 16 is formed on one of the side walls 17 of the stroke structure 12, as mentioned above. In order to be able to ensure a connection which is as robust as possible, the second contact area 16 extends across more than one half of the width of the corresponding side wall 17 of the stroke structure 12, as shown in FIG. 3. The first contact area 15 is wider than the second contact area 16 in a transverse direction of the cantilever arm 8.

According to FIG. 3, the connecting element 14 has at least one cantilever section 28, 29, 30, wherein the connecting element 14 in the present exemplary embodiment has three cantilever sections 28, 29, 30. In at least one cantilever section 28, 29, 30, the connecting element 14 has at least one cantilever 31, 32. The at least one cantilever 31, 32 extends in a transverse direction of the connecting element 14 toward one of the two longitudinal sides 26, 27 of the connecting element 14. Consequently, the at least one cantilever 31, 32 projects outwards in a transverse direction of the connecting element 14. The at least one cantilever 31, 32 is oriented perpendicularly with respect to a longitudinal axis of the connecting element 14. According to the top view shown in FIG. 3, the cantilever 31, 32 has two opposite longitudinal sides 33, 34. The two longitudinal sides 33, 34 of the at least one cantilever 31, 32 are oriented parallel to one another and/or extend parallel to a transverse axis of the connecting element 14. The at least one cantilever 31, 32 has a free cantilever end 35. The free cantilever end 35 of the at least one cantilever 31, 32 is chamfered. The chamfer is designed such that the connecting element 14 tapers in the direction of the stroke structure 12. Moreover, the chamfer is aligned with one longitudinal side 36, 37 of the cantilever arm 8.

In the present exemplary embodiment, the at least one cantilever section 28, 29, 30 has two opposite cantilevers 31, 32. The first cantilever 31 extends in a transverse direction toward the first longitudinal side 26 of the connecting element 14. The second cantilever 32 is oriented counter to the first cantilever 31. Accordingly, the second cantilever 32 extends toward the second longitudinal side 27 of the connecting element 14.

The at least one recess 24, 25 is arranged in the at least one cantilever section 28, 29, as is apparent, in particular, in FIG. 3. The recess 24, 25 associated with the cantilever section 28, 29 extends into the first and the second cantilevers 31, 32 of the cantilever section 28, 29. Advantageously, at least one of the cantilever sections 28, 29 is formed as a closed ring.

In the exemplary embodiment shown in FIG. 3, the connecting element 14 includes first and second cantilever sections 28, 29 which are designed according to the preceding description. Accordingly, the first cantilever section 28 and the second cantilever section 29 each have two opposite cantilevers 31, 32. In addition, the first cantilever section 28 has a first recess 24 and the second cantilever section 29 has a second recess 25. The cantilever arm-side cantilever section 28 has a greater width in a transverse direction in comparison to the stroke structure-side cantilever section 29. Consequently, the cantilever sections 28, 29, 30 have a smaller width as the distance from the free cantilever-arm-end 11 increases. As is also apparent from FIG. 3, the free cantilever ends 35 of the first and the second cantilever sections 28, 29 are aligned with one another. Moreover, these are also aligned with the associated longitudinal side 36, 37 of the cantilever arm 8. Consequently, the two cantilever sections 28, 29 of the connecting element 14, together with the longitudinal sides 36, 37 of the cantilever arm 8, have a trapezoidal basic shape which tapers in the direction of the stroke structure 12.

Moreover, the connecting element 14 according to the exemplary embodiment shown in FIG. 3 has a third cantilever section 30. This third cantilever section 30 also has two cantilevers 31, 32, each of which extends toward one of the two longitudinal sides 26, 27 of the connecting element 14. In contrast to the first and the second cantilever sections 28, 29, the third cantilever section 30 widens in the direction of the stroke structure 12. Since the second contact area 16 is formed between the third cantilever section 30 and the stroke structure 12 in the present case, a larger width of the second contact area 16 can be achieved as a result. Yet another difference between the third cantilever section 30, which is adjacent to the stroke structure 12, and the other cantilever sections 28, 29 is that the third cantilever section 30 does not have a recess, but rather is closed over the entire surface. The stability of the third cantilever section 30, which is directly adjacent to the stroke structure 12, can be increased as a result of not having a recess.

According to FIG. 3, the connecting element 14 has at least one bridging section 38, 39, 40. This at least one bridging section 38, 39, 40 connects one of the cantilever sections 28, 29, 30 to the cantilever arm-side first contact area 15 or to a cantilever section 28, 29, 30 which is adjacent in a longitudinal direction. The at least one bridging section 38, 39, 40 is arranged centrally in a transverse direction of the connecting element 14. Moreover, the at least one bridging section 38, 39, 40 has a smaller width in comparison to the at least one adjacent cantilever section 28, 29, 30. The at least one bridging section 38, 39, 40 preferably has concavely curved longitudinal sides.

In the exemplary embodiment shown in FIG. 3, the connecting element 14 has lateral incisions 41. The lateral incisions 41 extend from one of the two longitudinal sides 26, 27 of the connecting element 14 into the connecting element 14. The incisions 41 are arranged in the region of the bridging sections 38, 39, 40 in the longitudinal direction of the connecting element 14. Accordingly, the bridging sections 38, 39, 40 each have an adjacent incision 41 on their two longitudinal sides.

In the present exemplary embodiment, the connecting element 14 has a first bridging section 38 which is arranged between the free cantilever-arm-end 11 and the first cantilever section 28 in the longitudinal direction of the connecting element 14. The connecting element 14 is therefore connected to the free cantilever-arm-end 11 via the first bridging section 38. Consequently, the first contact area 15 is formed between the free cantilever-arm-end 11 and the first bridging section 38. The first bridging section 38 has a smaller width in comparison to the free cantilever-arm-end 11 in a transverse direction of the connecting element 14.

A second bridging section 39 is formed between the first and the second cantilever sections 28, 29. Consequently, the first and the second cantilever sections 28, 29 are spaced apart from one another in the longitudinal direction of the connecting element 14 and are connected to one another via the second bridging section 39. The second bridging section 39, which is closer to the stroke structure 12, has a smaller width in comparison to the first bridging section 38 in a transverse direction of the connecting element 14. Moreover, the connecting element 14 has a third bridging section 40. The third bridging section 40 is arranged between the second cantilever section 29 and the third cantilever section 30 in the longitudinal direction of the connecting element 14. Consequently, the second cantilever section 29 is also spaced apart from the third cantilever section 30 in the longitudinal direction of the connecting element 14 and is connected to the third cantilever section 30 via the third bridging section 40. The third bridging section 40 has a smaller width in comparison to the second bridging section 39 in a transverse direction of the connecting element 14. Therefore, the width of the bridging sections 38, 39, 40 decreases as the distance from the free cantilever-arm-end 11 increases.

In summary, it is therefore established that the width of the connecting element 14 iteratively decreases in the bridging sections 38, 39, 40 and increases in the cantilever sections 28, 29, 30. As a result, the connecting element 14 has a fir tree basic shape which preferably tapers in the direction of the stroke structure 12 in a longitudinal direction of the connecting element 14.

Figure 4:
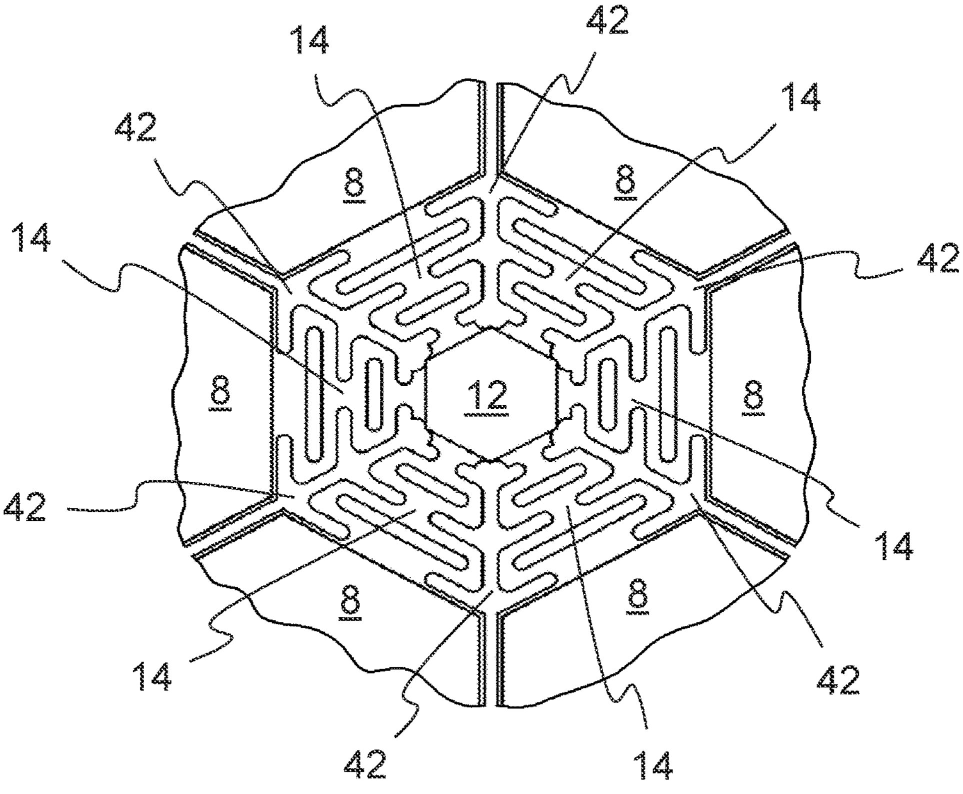
FIG. 4 shows a non-cut-out detailed view of the MEMS unit shown in FIG. 2 in the region of the stroke structure and of the connecting elements.

FIG. 4 shows a non-cut-out detailed view of the MEMS unit 7 shown in FIG. 2 in the region of the stroke structure 12 which is connected to the cantilever arms 8 via the respective connecting elements 14. It becomes apparent from the top view shown that the connecting elements 14 extend radially outwards with the associated cantilever arm 8 in the shape of a star from the central stroke structure 12 which is in the form of a hexagon in the present case. Only one single connecting element 14 is associated with each of the cantilever arms 8. Moreover, each connecting element 14 has only one single first contact area 15 to the associated cantilever arm 8. Similarly, each connecting element 14 has only one single second contact area 16 to the stroke structure 12. The connecting elements 14 and the cantilever arms 8 are spaced apart from the adjacent connecting elements 14 and adjacent cantilever arms 8 via a slit 42, such that there is no connection between these.

The present invention is not limited to the exemplary embodiments shown and described. Variations within the scope of the patent claims are possible, as is a combination of the features, even if these are shown and described in different exemplary embodiments.

LIST OF REFERENCE CHARACTERS

1 MEMS device
2 diaphragm
3 stroke axis
4 diaphragm layer
5 diaphragm carrier
6 stiffening element
7 MEMS unit
8 cantilever arm
9 cavity
10 carrier
11 free cantilever-arm-end
12 stroke structure
13 adhesive
14 connecting element
15 first contact area
16 second contact area
17 side wall of the stroke structure
18 carrier layer
19 piezoelectric layer
20 stroke structure-base
21 stroke-structure end face
22 circuit board
23 circuit-board cavity
24 first recess
25 second recess
26 first longitudinal sides of the connecting element
27 second longitudinal sides of the connecting element
28 first cantilever section
29 second cantilever section
30 third cantilever section
31 first cantilever
32 second cantilever
33 first longitudinal side of the cantilever
34 second longitudinal side of the cantilever
35 cantilever end
36 first longitudinal side of the cantilever arm
37 second longitudinal side of the cantilever arm
38 first bridging section
39 second bridging section
40 third bridging section
41 incision
42 slit

The invention claimed is:

1. A MEMS device for generating sound and/or detecting sound, the MEMS device comprising:
a diaphragm deflectable along a stroke axis; and
a MEMS unit comprising:
at least one cantilever arm configured to generate and/or detect a stoke motion of the diaphragm, the at least one cantilever arm being spaced apart from the diaphragm along the stroke axis such that a cavity is formed between the at least one cantilever arm and the diaphragm;
a stroke structure arranged in the cavity and being connected to the diaphragm; and
a connecting element that movably connects the at least one cantilever arm to the stroke structure;
wherein:
the connecting element narrows in at least one area and widens in at least one area in the direction of the stroke structure;
the connecting element includes a first cantilever section and a second cantilever section, which are spaced apart from one another in the longitudinal direction of the connecting element;
the connecting element includes a bridging section which is formed between the first cantilever section and the second cantilever section; and
the first cantilever section and the second cantilever section are connected to one another via the bridging section.

2. The MEMS device of claim 1, wherein the connecting element comprises a single connecting element, the at least one cantilever arm being connected to the stroke structure via only the single connecting element, and wherein both of the first cantilever section and the second cantilever section have two opposite cantilevers.

3. The MEMS device of claim 1, wherein two opposite longitudinal sides of the connecting element and/or a basic shape of the connecting element taper(s) in the shape of a trapezoid in the direction of the stroke structure.

4. The MEMS device of claim 1, wherein the connecting element includes two opposite longitudinal sides and further includes at least one cantilever section in which the connecting element has at least one cantilever, the at least one cantilever extending in a transverse direction of the connecting element toward one of the two opposite longitudinal sides of the connecting element.

5. The MEMS device of claim 4, wherein the at least one cantilever comprises first and second cantilevers situated opposite one another and wherein the two opposite longitudinal sides of the connecting element comprise first and second longitudinal sides of the connecting element, wherein the first cantilever extends toward the first longitudinal side of the connecting element and the second cantilever extends toward the second longitudinal side of the connecting element.

6. The MEMS device of claim 5, wherein the connecting element has the at least one recess, the at least one recess extending completely through the connecting element in the direction of the stroke axis;
wherein:
the at least one recess is closed in the shape of a ring in its circumferential direction; and/or
the at least one recess is arranged in the at least one cantilever section and extends into at least one of the first cantilever or the second cantilever.

7. The MEMS device of claim 1, wherein the connecting element is connected to the at least one cantilever arm via a single, first contact area extending in a transverse direction of the at least one cantilever arm.

8. The MEMS device of claim 7, wherein the at least one cantilever arm has a free cantilever-arm-end facing away from a carrier of the MEMS unit; and
the first contact area is arranged on the free cantilever-arm-end and/or is narrower than the free cantilever-arm-end in the transverse direction of the at least one cantilever arm.

9. The MEMS device of claim 7, wherein the connecting element is connected to the stroke structure via a single, second contact area extending in the transverse direction of the at least one cantilever arm.

10. The MEMS device of claim 9, wherein the first contact area is wider than the second contact area in the transverse direction of the at least one cantilever arm.

11. The MEMS device of claim 9, wherein the connecting element includes at least one cantilever section in which the connecting element has at least one cantilever, the at least one cantilever extending in a transverse direction of the connecting element toward one of two opposite longitudinal sides of the connecting element;

wherein the connecting element includes at least one bridging section that connects the at least one cantilever section to at least one of the first contact area, the second contact area, or an adjacent further cantilever section.

12. The MEMS device of claim 11, wherein the at least one bridging section is arranged centrally in the transverse direction of the connecting element and/or has a smaller width in comparison with the at least one cantilever section.

13. The MEMS device of claim 11, wherein the at least one bridging section has at least one lateral incision that extends from one of the two opposite longitudinal sides of the connecting element into the connecting element.

14. The MEMS device of claim 1, wherein the connecting element has a fir tree basic shape, and/or the connecting element includes multiple cantilever sections spaced apart from one another in a longitudinal direction of the connecting element, at least one of the multiple cantilever sections having at least one cantilever extending in a transverse direction of the connecting element toward one of two opposite longitudinal sides of the connecting element.

15. The MEMS device of claim 14, wherein the multiple cantilever sections have a smaller width with respect to one another as the connection section extends radially from the at least one cantilever arm towards the stroke structure.

16. The MEMS device of claim 1, wherein the at least one cantilever arm has a trapezoidal shape which tapers in the direction of the stroke structure, the connecting element continuing this trapezoidal shape in the direction of the stroke structure.

17. The MEMS device of claim 1, wherein the at least one cantilever arm comprises multiple cantilever arms and wherein the connecting arm comprises one connecting arm of multiple connecting arms, each cantilever arm of the multiple cantilever arms being connected to the stroke structure via a respective single connecting element of the multiple connecting elements.

18. An electronic device having a MEMS device according to claim 1.

19. The MEMS device of claim 1, wherein the connecting element includes at least one cantilever section in which the connecting element has at least one cantilever, the at least one cantilever extending in a transverse direction of the connecting element toward one of two opposite longitudinal sides of the connecting element;

wherein the connecting element includes at least one bridging section that connects the at least one cantilever section to an adjacent further cantilever section.

20. A MEMS unit comprising:

at least one cantilever arm for generating and/or detecting a stroke motion of a diaphragm;

a stroke structure configured to be connected to the diaphragm; and a connecting element that movably connects the cantilever arm to the stroke structure, wherein:

the connecting element narrows and widens at least in one section in the direction of the stroke structure;

the connecting element includes a first cantilever section and a second cantilever section, which are spaced apart from one another in the longitudinal direction of the connecting element;

the connecting element includes a bridging section which is formed between the first cantilever section and the second cantilever section; and the first cantilever section and the second cantilever section are connected to one another via the bridging section.

* * * * *